United States Patent
Smith et al.

(10) Patent No.: US 10,293,915 B2
(45) Date of Patent: May 21, 2019

(54) APPARATUSES AND METHODS FOR AERODYNAMIC WINDOW ASSEMBLIES

(71) Applicant: THE BOEING COMPANY, Chicago, IL (US)

(72) Inventors: Randal H. Smith, Seattle, WA (US); Philippe R. Spalart, Seattle, WA (US); Stephen T. LeDoux, Seattle, WA (US); Hugh Poling, Seattle, WA (US); Jerald C. Baillie, Seattle, WA (US)

(73) Assignee: The Boeing Company, Chicago, IL (US)

( * ) Notice: Subject to any disclaimer, the term of this patent is extended or adjusted under 35 U.S.C. 154(b) by 319 days.

(21) Appl. No.: 15/377,630

(22) Filed: Dec. 13, 2016

(65) Prior Publication Data

US 2018/0162512 A1    Jun. 14, 2018

(51) Int. Cl.
*B64C 1/14* (2006.01)
*B64F 5/10* (2017.01)

(52) U.S. Cl.
CPC .......... *B64C 1/1484* (2013.01); *B64C 1/1476* (2013.01); *B64C 1/1492* (2013.01); *B64F 5/10* (2017.01)

(58) Field of Classification Search
CPC ... B64C 1/1484; B64C 1/1476; B64C 1/1492; B64F 5/10
See application file for complete search history.

(56) References Cited

U.S. PATENT DOCUMENTS

| | | | |
|---|---|---|---|
| 2,612,606 A | 9/1951 | Wehner | |
| 2,575,757 A | 11/1951 | Hardy | |
| 2,755,216 A | 7/1956 | Lemons | |
| 2,873,931 A | 2/1959 | Fleischmann | |
| 3,002,190 A | 9/1961 | Oleesky et al. | |
| 3,463,418 A | 8/1969 | Miksch | |
| 3,604,661 A | 9/1971 | Mayer, Jr. | |
| 4,189,120 A | 2/1980 | Wang | |

(Continued)

FOREIGN PATENT DOCUMENTS

EP    2626293 A1    8/2013

OTHER PUBLICATIONS

Extended European Search Report for co-pending European Application No. 172049405-1010, dated Feb. 5, 2018 (7 pages).

(Continued)

*Primary Examiner* — Valentina Xavier

(74) *Attorney, Agent, or Firm* — Joseph F. Harding; The Small Patent Law Group

(57) ABSTRACT

A window assembly for an aircraft is provided that includes a windshield, a side window, a post, and an airflow surface. The windshield is oriented toward a front of the aircraft. The side window is oriented toward a side of the aircraft. The post is interposed between the windshield and the side window. The airflow surface is disposed on the post and on an exterior of the aircraft. The airflow surface extends along a length from a leading edge proximate the windshield to a trailing edge proximate the side window, and extends along a height between a top and a bottom. The airflow surface has a first radius of curvature proximate the leading edge and a second radius of curvature proximate the trailing edge, wherein the first radius of curvature is less than the second radius of curvature.

20 Claims, 8 Drawing Sheets

(56) References Cited

U.S. PATENT DOCUMENTS

| | | |
|---|---|---|
| 4,318,328 A | 3/1982 | Rona |
| 4,365,574 A | 12/1982 | Norminton |
| 4,458,936 A | 7/1984 | Mulholland |
| 4,661,821 A | 4/1987 | Smith |
| 4,867,394 A | 9/1989 | Patterson, Jr. |
| 4,878,062 A | 10/1989 | Craven et al. |
| 5,093,313 A | 3/1992 | Minovitch |
| 5,209,434 A | 5/1993 | Lo Presti et al. |
| 5,213,435 A | 5/1993 | Hirata et al. |
| D344,489 S | 2/1994 | Webb |
| 5,458,299 A | 10/1995 | Collins et al. |
| 5,689,276 A | 11/1997 | Uematsu et al. |
| 5,692,709 A | 12/1997 | Mihora et al. |
| 5,805,111 A | 9/1998 | Brettner et al. |
| 5,986,611 A | 11/1999 | Harrison et al. |
| 6,065,800 A | 5/2000 | Olson |
| D432,073 S | 10/2000 | Coyle |
| 6,204,820 B1 | 3/2001 | Jensen, Jr. |
| 6,414,644 B1 | 7/2002 | Desargant et al. |
| 6,570,540 B2 | 5/2003 | Desargant et al. |
| 6,608,596 B2 | 8/2003 | Bien et al. |
| 6,751,442 B1 | 6/2004 | Barrett |
| D497,586 S | 10/2004 | Ferguson |
| 6,814,474 B2 | 11/2004 | Groeller |
| 6,831,612 B2 | 12/2004 | Quagliaro |
| 6,844,856 B1 | 1/2005 | Wright |
| 6,856,295 B2 | 2/2005 | Desargant et al. |
| 6,992,640 B2 | 1/2006 | Usami et al. |
| 7,123,199 B2 | 10/2006 | Rotta |
| 7,967,252 B2 | 6/2011 | Ferguson et al. |
| 7,967,253 B2 | 6/2011 | Ferguson et al. |
| 8,128,035 B2 | 3/2012 | Malachowski et al. |
| D733,031 S * | 6/2015 | Horlin .......................... D12/345 |
| 10,073,178 B2 * | 9/2018 | Hara ...................... G01S 17/936 |
| 2003/0052829 A1 | 3/2003 | Desargant et al. |
| 2003/0142024 A1 | 7/2003 | Carson |
| 2006/0006287 A1 | 1/2006 | Ferguson et al. |
| 2010/0224729 A1* | 9/2010 | Lieven .................. B64C 1/1492<br>244/129.3 |
| 2012/0193474 A1* | 8/2012 | Lafon .................. B64C 1/1484<br>244/129.3 |
| 2012/0223187 A1 | 9/2012 | Kismarton |
| 2014/0097295 A1* | 4/2014 | Bouffanais ............ B64C 1/1484<br>244/129.3 |
| 2015/0064389 A1* | 3/2015 | Zahlen .................... B32B 37/16<br>428/76 |
| 2017/0166293 A1* | 6/2017 | Chaumel ............... B64C 1/1492 |

OTHER PUBLICATIONS

Office Action for co-pending European Application No. 17204940.5-1010 dated Feb. 4, 2019 (4 pages).

* cited by examiner

… (1) …

APPARATUSES AND METHODS FOR AERODYNAMIC WINDOW ASSEMBLIES

FIELD OF EMBODIMENTS OF THE DISCLOSURE

Embodiments of the present disclosure generally relate to systems and methods for aerodynamic window assemblies.

BACKGROUND OF THE DISCLOSURE

Window structures or assemblies may be used to surround or enclose a cockpit of an aircraft. Such structures, however, may have issues (e.g., with flow separation) between windows (e.g., between a windshield and a side window). The flow separation, for example, may increase noise which may reduce the comfort of the pilot and/or other crew in the flight deck. The flow separation may also increase drag which may reduce aircraft performance. It may be noted that the flow separation may be caused at least in part by a shockwave that is formed on the frames of a window structure.

SUMMARY OF THE DISCLOSURE

Accordingly, reduction of flow separation and/or improvement of airflow around window structures or assemblies is provided in various embodiments disclosed herein.

Certain embodiments of the present disclosure provide a window assembly for an aircraft. The window assembly includes a windshield, a side window, a post, and an airflow surface. The windshield is oriented toward a front of the aircraft. The side window is oriented toward a side of the aircraft. The post is interposed between the windshield and the side window. The airflow surface is disposed on the post and on an exterior of the aircraft. The airflow surface extends along a length from a leading edge proximate the windshield to a trailing edge proximate the side window, and extends along a height between a top and a bottom. The airflow surface has a first radius of curvature proximate the leading edge and a second radius of curvature proximate the trailing edge, wherein the first radius of curvature is less than the second radius of curvature.

Certain embodiments of the present disclosure provide a method. The method includes providing a windshield oriented toward a front of an aircraft, a side window oriented toward a side of the aircraft, and a post interposed between the windshield and the side window. The method also includes forming an airflow surface disposed on the post and on an exterior of the aircraft. The airflow surface extends along a length from a leading edge proximate the windshield to a trailing edge proximate the side window, and extends along a height between a top and a bottom. The airflow surface has a first radius of curvature proximate the leading edge and a second radius of curvature proximate the trailing edge, wherein the first radius of curvature is less than the second radius of curvature.

Certain embodiments of the present disclosure provide an aerodynamic member. The aerodynamic member is configured to be secured to an aircraft window assembly that includes a windshield oriented toward a front of an aircraft, a side window oriented toward a side of the aircraft, and a post interposed between the windshield and the side window. The aerodynamic member includes an airflow surface configured to be disposed on the post and on an exterior of the aircraft when the aerodynamic member is secured to the aircraft window assembly. The airflow surface extends along a length from a leading edge of the airflow surface to a trailing edge of the airflow surface, and extends along a height between a top and a bottom. The airflow surface has a first radius of curvature proximate the leading edge and a second radius of curvature proximate the trailing edge, wherein the first radius of curvature is less than the second radius of curvature.

DETAILED DESCRIPTION OF THE DISCLOSURE

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

Various embodiments provide improved aerodynamic profiles for surfaces of window structures or assemblies (e.g., structures in which two or more windows are joined). Various embodiments provide improved aerodynamic profiles between two window panels. For example, the profile may have a thicker leading edge than a trailing edge, and/or be generally more curved toward the leading edge and generally flatter toward the trailing edge. The disclosed shape in various embodiments provides a smoother pressure curve that eliminates or reduces flow separation, thereby eliminating or reducing reverse flow. Various embodiments provide reduced peak Mach number and reduced shock wave strength for airflow over a window assembly.

Figure 1:
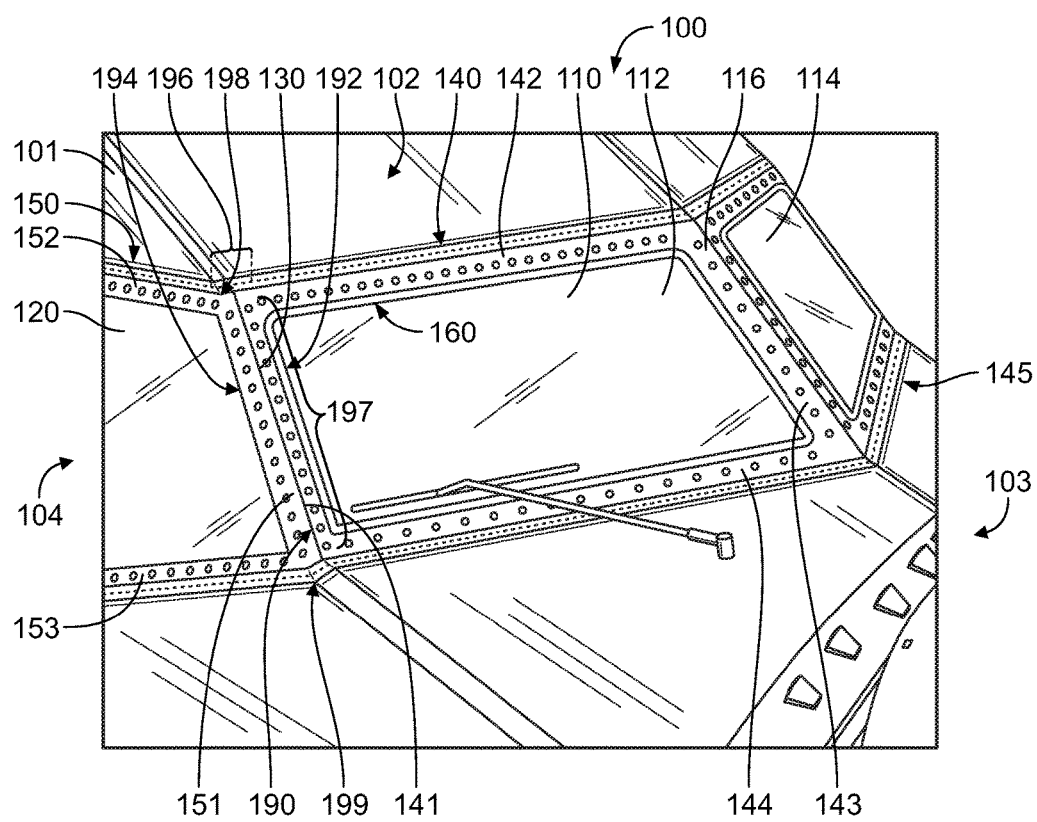
FIG. 1 illustrates a perspective view of a window assembly, according to an embodiment of the present disclosure.

FIG. 1 illustrates a perspective view of a window assembly 100, according to an embodiment of the present disclosure. The depicted window assembly 100 is for an aircraft 101 (in the illustrated embodiment, for a cockpit of the aircraft 101). The window assembly 100 includes a windshield 110, a side window 120, a post 130, and an airflow surface 190.

The windshield 110 is oriented toward a front 103 of the aircraft 101, and is generally transparent to provide forward visibility to a crew of the aircraft 101. In the illustrated embodiment, the windshield 110 includes a first portion 112 and a second portion 114 separated by a center post 116.

As seen in FIG. 1, the side window 120 of the illustrated example is oriented toward a side 104 of the aircraft 101. The side window 120 is generally transparent to provide sideward visibility to a crew of the aircraft 101. A generally similar side window may be disposed on the opposite side of the aircraft 101 as well.

The post 130 is interposed between the windshield 110 and the side window 120. The post 130 may be understood as a structure interposed between windows (e.g., between a windshield and a side window). It may be noted that in some embodiments the post 130 may be a single, unitary structure, while in other embodiments the post 130 may be comprised of two or more structures or pieces that cooperate to form the post 130.

For example, in the illustrated embodiment, portions of a windshield frame 140 and a side frame 150 cooperate to form the post 130. The depicted windshield frame 140 surrounds the first portion 112 of the windshield 110. A generally similar frame 145 may surround the second portion 114 of the windshield 110. The windshield 110 includes a first member 141, and second member 142, a third member 143, and a fourth member 144, arranged in a generally quadrilateral shape around the first portion 112 of the windshield 110. The third member 143 of the illustrated example cooperates with a corresponding member of the frame 145 to form the center post 116 of the windshield 110.

The side frame 150 includes a first member 151, a second member 152, and a third member 153, which may cooperate with a fourth member (not shown in FIG. 1) to form a generally quadrilateral shape around the side window 120. The first member 151 of the side frame 150 and the first member 141 of the windshield frame 140 cooperate to form the post 130 in the illustrated embodiment. Accordingly, the post 130 includes at least a portion of the windshield frame 140 (e.g., the first member 141) and at least a portion of the side frame 150 (e.g., the first member 151). Caulk may be used at the joint between the first member 151 and the first member 141 in forming the post 130. In the illustrated embodiment, a seal 160 is shown between the windshield frame 140 and the windshield 110. Another seal (not labelled in FIG. 1) may be positioned between the side frame 150 and the side window 120.

The airflow surface 190 is disposed on the post 130 and on an exterior 102 of the aircraft 101. It may be noted that the airflow surface 190 may be disposed directly on the post 130 (e.g., as a surface of the post 130) or indirectly on the post 130 (e.g., as part of a member that is joined, affixed, or secured to the post 130). For example, the airflow surface 190 may be formed on an outer surface of the post 130 (e.g., on outer surfaces of the first member 141 of the windshield frame 140 and the first member 151 of the side frame 150). For instance, in some embodiments, the airflow surface 190 is a machined surface of the post 130. As another example, the airflow surface 190 may be formed as a member that is attached or secured to the post 130. Additionally, or alternatively, a portion of the airflow surface 190 may be disposed on one or more seals interposed between the post 130 and a window (e.g., between the first member 141 and the windshield 110 and/or between the first member 151 and the side window 120).

As seen in FIG. 1 (see also FIG. 7 and related discussion), the airflow surface 190 extends along a length 196 from a leading edge 192 to a trailing edge 194. The leading edge 192 may be referred to as leading the trailing edge 194 as the leading edge 192 is exposed to airflow, along the direction of the flow of air, before the trailing edge 194. The leading edge 192 is proximate the windshield 110 and the trailing edge 194 is proximate the side window 120. The airflow surface 190 also extends along a height 197 between a top 198 and a bottom 199.

Figure 2:
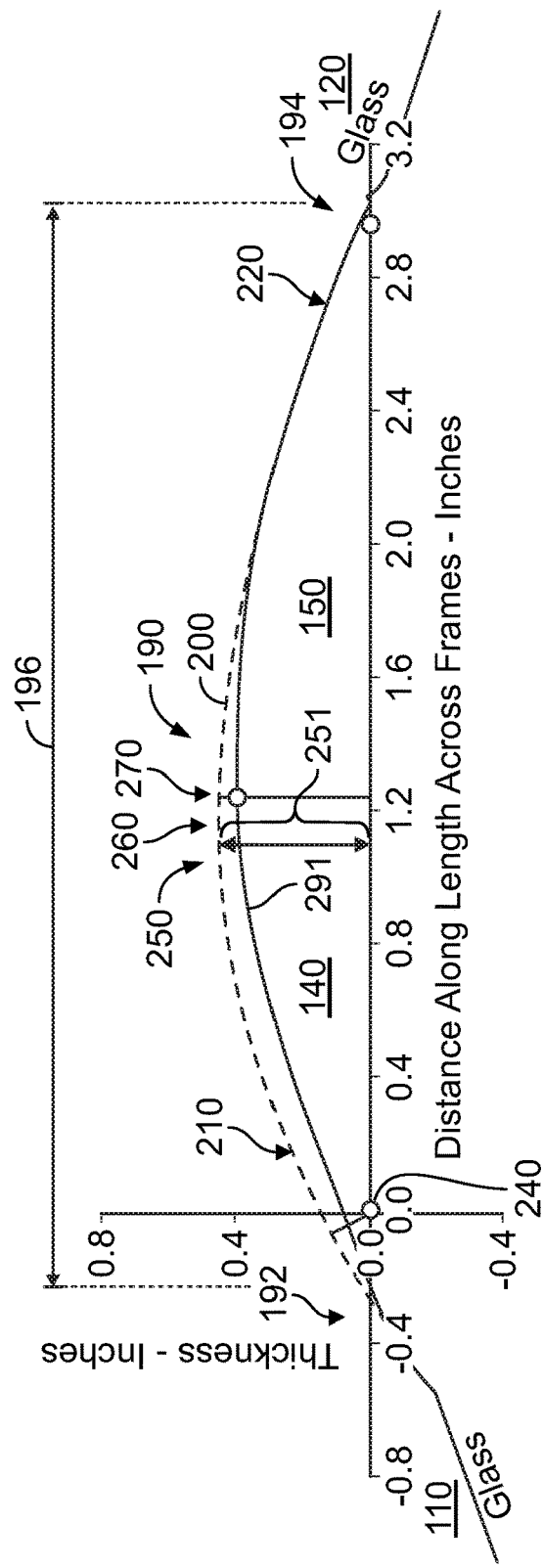
FIG. 2 illustrates a schematic view of a profile of an airflow surface, according to an embodiment of the present disclosure.

As best seen in FIG. 2, the airflow surface 190 defines a profile 200 (shown in dashed lines). The airflow surface 190 has a first radius of curvature 210 proximate the leading edge 192 and a second radius of curvature 220 proximate the trailing edge 194. The first radius of curvature 210 is less than the second radius of curvature 220 (or, put another way, the profile 200 of the airflow surface 190 is more curved at point proximate the leading edge 192 than at a point proximate the trailing edge 194). (For comparison, the solid line represented by 291 in FIG. 2 includes a constant radius of curvature.) It may be noted that the profile 200 also provides for a thicker leading edge than trailing edge. The disclosed shape in various embodiments provides a smoother pressure curve that eliminates or reduces flow separation, thereby eliminating or reducing reverse flow. It may be noted that plural different radii of curvature may be present along the profile. For example, the radius of curvature may change continuously along the profile 200, or, as another example, may change in discrete steps along the profile 200. In some embodiments, the radius of curvature may start at a first value at the leading edge 192, decrease as the profile 200 extends toward the trailing edge 194 until it reaches a minimum value at a point between the leading edge 192 and the trailing edge 194, and then increase as the profile 200 continues to extend toward the trailing edge 194.

As seen in FIG. 2, the leading edge 192 begins proximate the windshield 110. The point 240 marked "0.0" in FIG. 2 corresponds to the end of the windshield 110. It may be noted that the profile 200 may deviate from the flat shape of the windshield 110 before the "0.0" point due to a seal or other member disposed on the exterior of the windshield 110 proximate the edge of the windshield 110. As the profile 200 extends toward the trailing edge 194, the profile 200 becomes thicker (e.g., the distance between the exterior of the airflow surface 190 and a line connecting the points of contact between the windshield 110 and the post 130 and the side window 120 and the post 130) until it reaches a point of maximum thickness 250 (at which point the thickness is a maximum thickness 251). As used herein, a radius of curvature may be understood as the radius of circle that touches a curve at a given point for which the particular radius is defined, and has the same tangent and curvature at that point. Also, the radius of curvature decreases (or the profile 200 becomes more curved) until it reaches a point of minimum radius of curvature 260. It may be noted that the points of minimum radius of curvature 260 and maximum thickness 250 may or may not coincide in various embodiments. Then, as the profile 200 extends toward the trailing edge 194, the radius of curvature increases (or the profile 200 becomes flatter) and the thickness also reduces until the profile 200 terminates at the side window 120. For the illustrated example, the side window 120 is substantially flat (e.g., within manufacturing tolerances of being flat), and the airflow surface 190 has a linear slope (e.g., infinite radius of curvature) at the trailing edge 194 as the airflow surface 190 terminates at the side window 120. A portion of the airflow surface 190 proximate the side window 120 may be defined by a seal interposed between the post 130 and the side window 120 in some embodiments.

For the embodiment depicted in FIGS. 1 and 2, a midpoint 270 may be defined at a midway point along the length 196. In some embodiments, the midpoint 270 may correspond to the junction of the windshield frame 140 with the side frame 150 (e.g., the junction of the first member 141 and the first member 151). For the depicted example, the point of minimum radius of curvature 260 is interposed between the leading edge 192 and the midpoint 270 (or, closer to the leading edge 192 than the trailing edge 194). It may be noted that, while multiple frames (e.g., a windshield frame and a side frame) are shown in the depicted embodiment, a single frame may be employed in other embodiments.

Also, for the depicted example, the point of maximum thickness 250 is interposed between the leading edge 192 and the midpoint 270 (or, closer to the leading edge 192 than the trailing edge 194). In some embodiments, the length 196 of the airflow surface 190 may be between 3 and 4 inches, and the maximum thickness 250 may be between 0.35 and 0.5 inches. Other sizes may be utilized in other embodiments.

In various embodiments, the profile 200 of the airflow surface 190 is configured based on local flow conditions. For example, through actual testing (e.g., in a wind tunnel) of different airflow surface shapes and/or computer simulations of flow over different airflow surface shapes, various different potential profiles may be evaluated and the profile 200 selected or otherwise designed. Small changes may be made to the shape of the profile 200, and a figure of merit determined for each different profile tested. For example, one or more of a flow angle on a downstream window or peak Mach number (with lower values of peak Mach number desirable) may be employed as a figure of merit to evaluate different profiles. Generally, the profile 200 may be shaped to minimize or eliminate a region of reverse flow caused by separation. It may further be noted that, in some embodiments, one or more aspects of the profile 200 (e.g., the shape of the profile including the radius of curvature at one or more points along the profile 200, the thickness at one or more points along the profile 200, the location of the minimum radius of curvature, the location of the maximum thickness) may vary along the height 197 of the airflow surface 190. For example, the profile 200 may be used at a first height along the post 130, and a differently shaped profile used at a second height. The profile 200 may vary continuously along the height 197 in some embodiments, and may vary in discrete steps along the height 197 in other embodiments.

Figure 3:
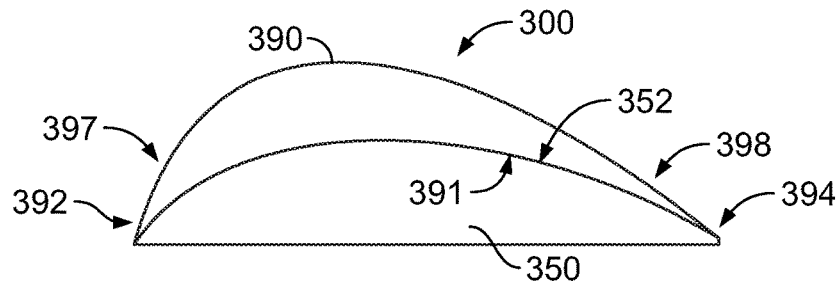
FIG. 3 provides a schematic top view of an aerodynamic member, according to an embodiment of the present disclosure.

As noted herein, in some embodiments, an outer surface of the post itself may form all or part of the airflow surface 190. In other embodiments, an aerodynamic member may be secured to an outer surface of the post, with the aerodynamic surface comprises all or a portion of the airflow surface 190. FIG. 3 illustrates a schematic top view of an aerodynamic member 300. The aerodynamic member 300 is secured to an outer surface 352 of a post 350, and the aerodynamic member 300 includes an airflow surface 390. The airflow surface 390 may incorporate one or more aspects of the airflow surface 190 discussed herein. For example, the depicted airflow surface 390 extends along a length from a leading edge 392 to a trailing edge 394, and extends along a height from a top to a bottom (not shown in FIG. 3; see FIG. 1 for an example height). The airflow surface 390 has a first radius of curvature 397 proximate the leading edge 392 and a second radius of curvature 398 proximate the trailing edge 394, with the first radius of curvature 397 less than the second radius of curvature 398 (or, a profile defined by the airflow surface 390 is more curved proximate the leading edge 392 than at the trailing edge 394; for an example profile 200 that may be used with the airflow surface 390, see FIG. 2 and related discussion).

As seen in FIG. 3, the post 350 includes an outer surface 352. The outer surface 352 of the post 350 may define a constant radius of curvature (e.g., within manufacturing tolerances). In the illustrated example, the aerodynamic member 300 includes an interior surface 391 that is configured to be secured to the outer surface 352 of the post. Accordingly, the aerodynamic member 300 may be understood as being secured to the post 350 proximate the interior surface 391. The shape or profile of the interior surface 391 may be configured to match with or mate to the outer surface 352 of the post 350. For example, with the outer surface 352 of the post 350 defining a constant radius of curvature, the interior surface 391 of the aerodynamic member 300 may also define a constant radius of curvature (e.g., within manufacturing tolerances). It may be noted that, in FIG. 2, the solid line 291 may correspond to the outer surface 352 and the interior surface 391, while the dashed line for the profile 200 corresponds to the airflow surface 390 of the aerodynamic member 300.

Figure 4:
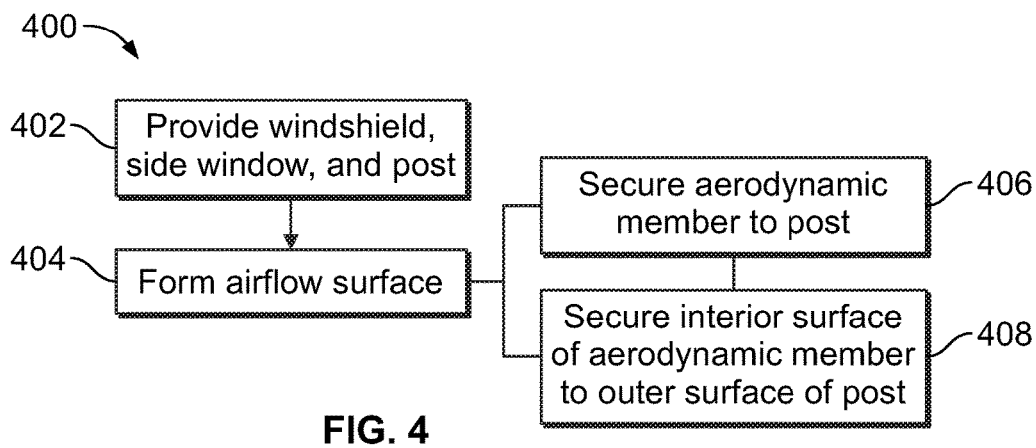
FIG. 4 is a flowchart of a method, according to an embodiment of the present disclosure.

FIG. 4 provides a flowchart of a method 400 (e.g., a method for improving airflow around a cockpit of an aircraft). The method 400, for example, may employ or be performed by structures or aspects of various embodiments (e.g., systems and/or methods and/or process flows) discussed herein. In various embodiments, certain steps may be omitted or added, certain steps may be combined, certain steps may be performed concurrently, certain steps may be split into multiple steps, certain steps may be performed in a different order, or certain steps or series of steps may be re-performed in an iterative fashion.

At 402, a windshield, side window, and post are provided. The windshield (e.g., windshield 110) is oriented toward a front of an aircraft. The side window (e.g., side window 120) is oriented toward a side of the aircraft, with the windshield and side window surrounding a portion of a cockpit. The post (e.g., post 130) is interposed between the windshield and the side window. The windshield, side window and post may be provided as separate parts during an assembly procedure, or may be provided as a group during a maintenance or retro-fitting procedure, for example.

At 404, an airflow surface is formed. The airflow surface is disposed on the post and on an exterior of the aircraft. The airflow surface extends along a length from a leading edge proximate the windshield to a trailing edge proximate the side window, and also extends along a height between a top and a bottom. In the illustrated embodiment, the airflow surface has a first radius of curvature proximate the leading edge and a second radius of curvature proximate the trailing edge. The first radius of curvature is less than the second radius of curvature. The particular configuration and/or variation of the radius of curvature and/or the thickness of the profile of the airflow surface, as discussed herein, is tailored in various embodiments to reduce or eliminate flow separation, thereby eliminating or reducing reverse flow, and reduces noise and/or drag to improve pilot comfort and/or aircraft performance.

It may be noted that the airflow surface may be formed at a time of manufacture, fabrication, and/or assembly of a post and/or windshield assembly. As one example, the outer surface of the post may be formed to provide the desired airflow surface. For instance, a portion of a windshield frame and a portion of a side window frame may cooperate to form the post, with outer surfaces of the portions of the windshield and side window frames formed at the time of the manufacture of the frames to provide the desired surface. In some embodiments, the window post may be machined to form the airflow surface.

As another example, the airflow surface may be formed using an aerodynamic member that is attached, mounted to, or otherwise secured to the post (e.g., to an outer surface of the post). For example, the airflow surface may be used to modify an existing airflow surface for an aircraft already in service or previously designed to have an improved airflow surface as discussed herein. In the illustrated embodiment, at 406, an aerodynamic member (e.g., aerodynamic member 300) is secured to an outer surface of the post as part of forming the airflow surface. The aerodynamic member includes the airflow surface (e.g., on an exterior surface of the aerodynamic member). At 408, the aerodynamic member is secured to the outer surface of the post by securing an interior surface of the aerodynamic member to the outer surface of the post. In some embodiments, the interior surface of the aerodynamic member has a constant radius of curvature (e.g., to match or correspond to a constant radius of curvature of the outer surface of the post).

Figure 7:
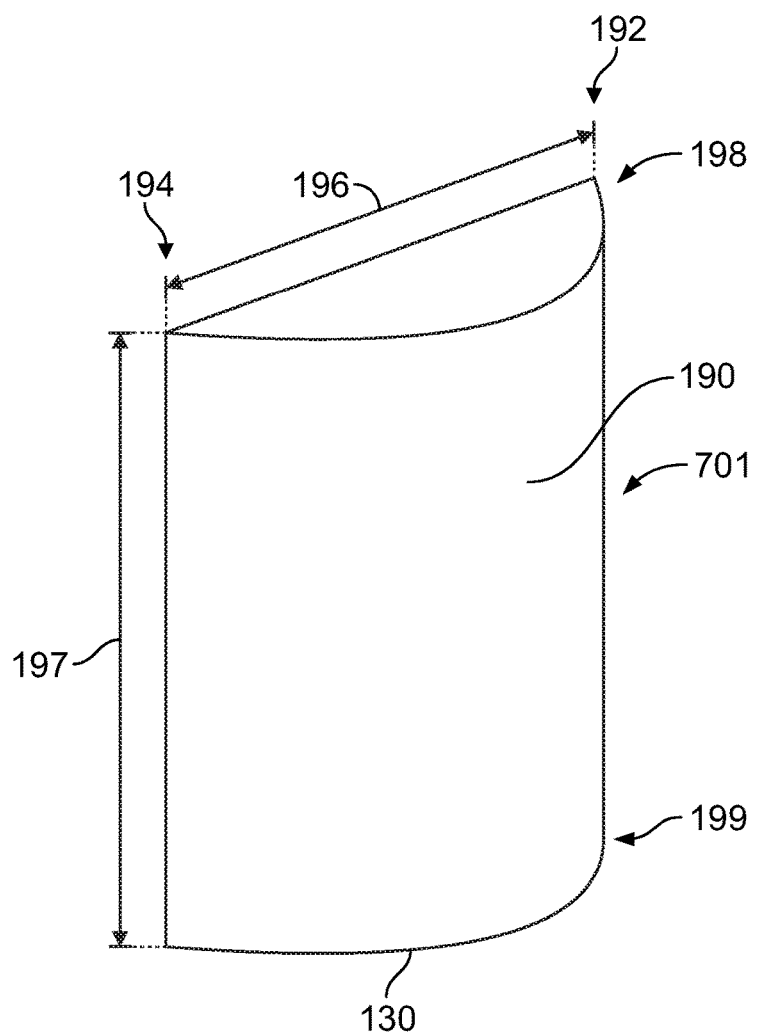
FIG. 7 is a perspective schematic view of a post, according to an embodiment of the present disclosure.

As discussed herein, the profile of an airflow surface in various embodiments varies along a length (in the direction of airflow), for example, to help reduce noise. FIG. 7 is a perspective schematic view of the post 130 having airflow surface 190 (see also FIG. 1 and related discussion), according to an embodiment of the present disclosure. As seen in FIG. 7, the airflow surface 190 has a height 197 extending between the top 198 and the bottom 199 of the post 130. Also the airflow surface 190 has a length 196 extending from the leading edge 192 to the trailing edge 194, with the airflow over the airflow surface 190 encountering the airflow surface 190 initially at the leading edge 192 and passing toward the trailing edge 194. The airflow surface 190 also defines an intermediate height 701 disposed along the height 197 and interposed between the top 198 and the bottom 199. FIGS. 8A-8C, 9A-9C, and 10A-10C depict various properties and dimensions of a representative airflow surface 190 at different locations along the height 197 of the airflow surface 190. It may be noted that other dimensions and properties may be utilized in other embodiments.

Figure 8A:
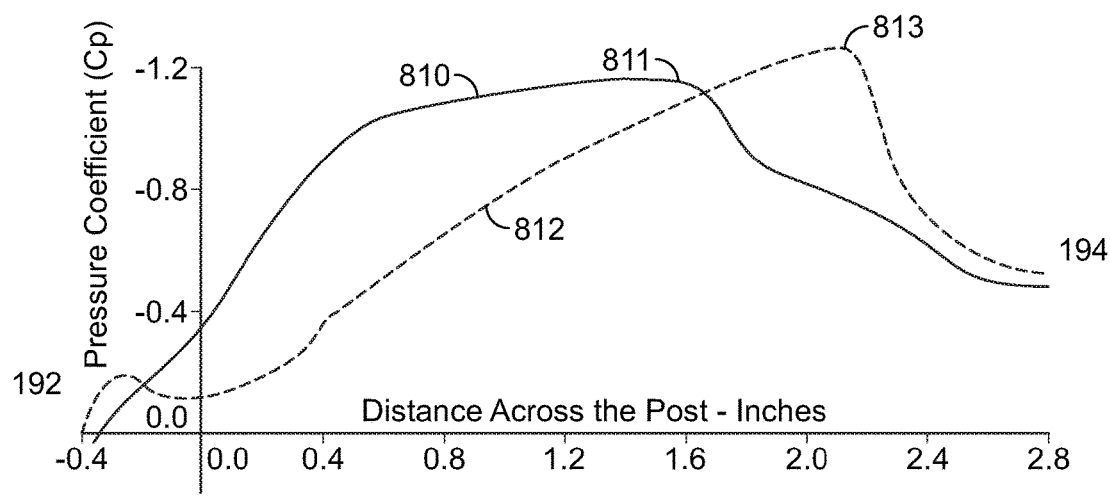
FIG. 8A is a plot of pressure coefficients along a length of an airflow surface of the post of FIG. 7 at a location proximate a bottom of the post.

For example, FIG. 8A is a plot of pressure coefficients along the length 196 of the airflow surface 190 of the post 130 at a location proximate the bottom 199 of the airflow surface 190. The solid plot 810 depicts the pressure coefficient of the airflow surface 190 proximate the bottom 199, while the dashed plot 812 depicts the pressure coefficient at a bottom position of an airflow surface having a constant radius of curvature. As seen in FIG. 8A, the pressure coefficient of the airflow surface 190 proximate the bottom 199 is initially (proximate the leading edge 192) higher (in terms of absolute value) than the pressure coefficient of the plot 812 of a constant radius airflow surface, but becomes relatively lower farther along the length of the airflow surface 190, and has a lower maximum absolute value 811 than the maximum value 813 of the plot 812 corresponding to a constant radius surface.

Figure 8B:
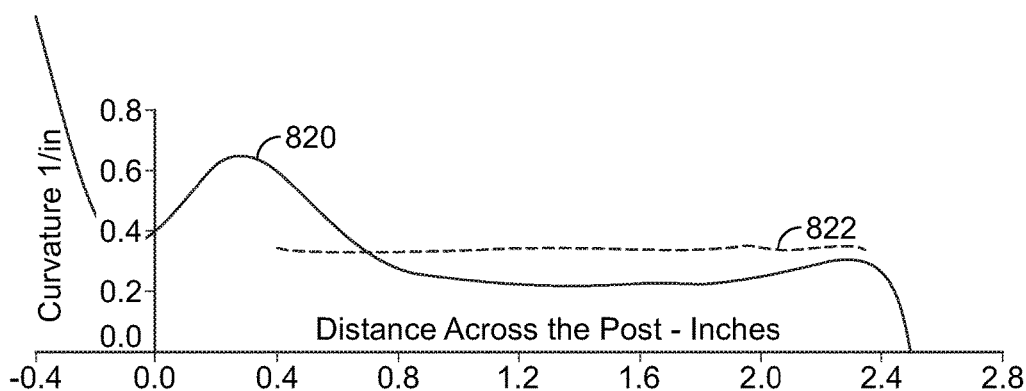
FIG. 8B is a plot of curvature along a length of an airflow surface of the post of FIG. 7 at the location proximate the bottom of the post.

FIG. 8B is a plot of curvature along the length 196 of the airflow surface 190 of the post 130 at the location proximate the bottom 199 of the airflow surface 190. The solid plot 820 depicts the curvature of the airflow surface 190 proximate the bottom 199, while the dashed plot 822 depicts the curvature at a bottom position of an airflow surface having a constant radius of curvature. As seen in FIG. 8B, the curvature of the airflow surface 190 proximate the bottom 199 is initially higher (proximate the leading edge 192) than the curvature of the plot 822 of the constant radius surface, but becomes lower as the airflow surface 190 extends toward the trailing edge 194.

Figure 8C:
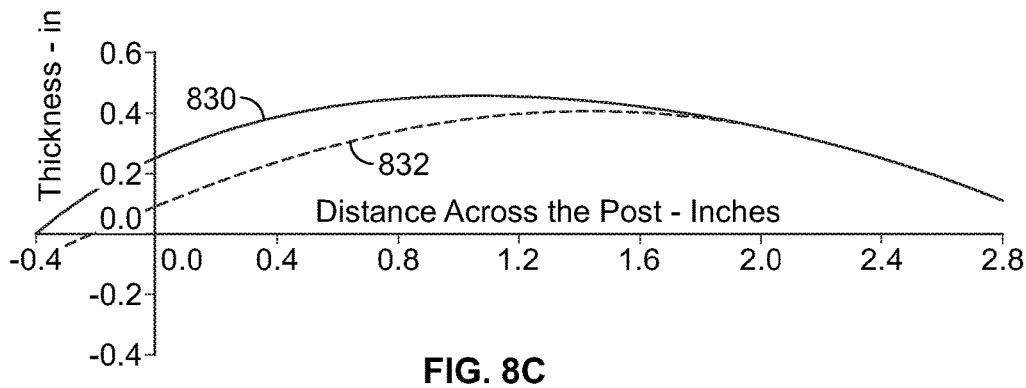
FIG. 8C is a plot of thickness along a length of an airflow surface of the post of FIG. 7 at the location proximate the bottom of the post.

FIG. 8C is a plot of thickness along the length 196 of the airflow surface 190 of the post 130 at the location proximate the bottom 199 of the airflow surface 190. The solid plot 830 depicts the thickness proximate the bottom 199, while the dashed plot 832 depicts the thickness at a bottom position of an airflow surface having a constant radius of curvature. As seen in FIG. 8C, the thickness of the airflow surface proximate the bottom 199 is initially larger (proximate the leading edge 192) than the thickness of the plot 832 of the constant radius surface, but eventually becomes similar to the thickness of the constant radius surface as the airflow surface 190 extends toward the trailing edge 194.

Figure 9A:
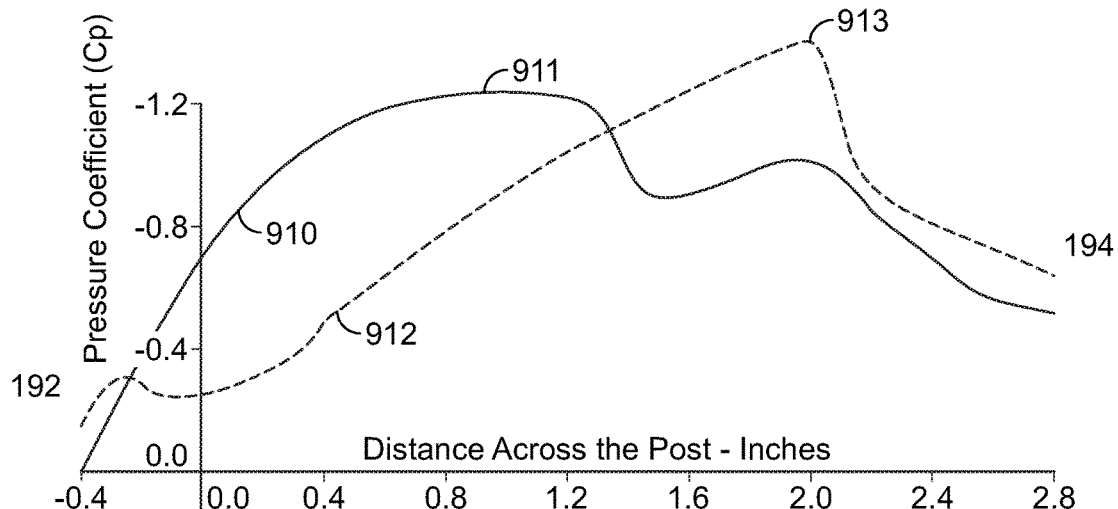
FIG. 9A is a plot of pressure coefficients along a length of an airflow surface of the post of FIG. 7 at a location proximate an intermediate height of the post.

FIG. 9A is a plot of pressure coefficients along the length 196 of the airflow surface 190 of the post 130 at intermediate height 701 of the airflow surface 190. The solid plot 910 depicts the pressure coefficient of the airflow surface 190 proximate the intermediate height 701, while the dashed plot 912 depicts the pressure coefficient at an intermediate position of an airflow surface having a constant radius of curvature. As seen in FIG. 9A, the pressure coefficient of the airflow surface 190 proximate the intermediate height 701 is initially higher (proximate the leading edge 192) than the pressure coefficient of the plot 912 of a constant radius airflow surface, but becomes relatively lower farther along the length of the airflow surface 190, and has a lower maximum value 911 than the maximum value 913 of the plot 912 corresponding to a constant radius surface.

Figure 9B:
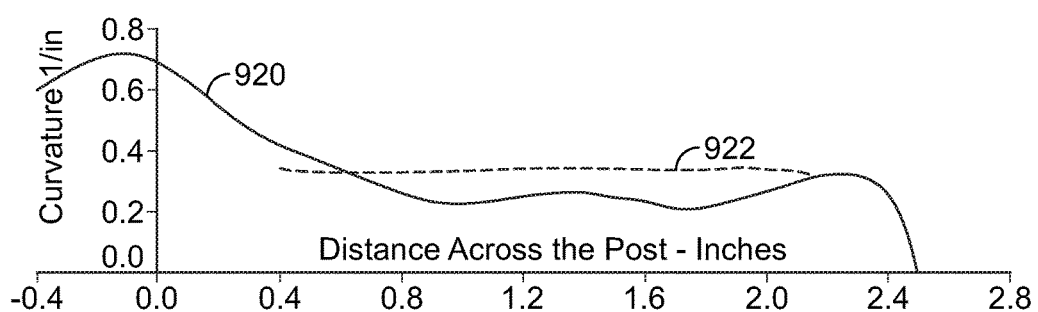
FIG. 9B is a plot of curvature along a length of an airflow surface of the post of FIG. 7 at the location proximate the intermediate height of the post.

FIG. 9B is a plot of curvature along the length 196 of the airflow surface 190 of the post 130 at the location proximate the intermediate height 701 of the airflow surface 190. The solid plot 920 depicts the curvature of the airflow surface 190 proximate the intermediate height 701, while the dashed plot 922 depicts the curvature at an intermediate position of an airflow surface having a constant radius of curvature. As seen in FIG. 9B, the curvature of the airflow surface 190 proximate the intermediate height 701 is initially higher (proximate the leading edge 192) than the curvature of the plot 922 of the constant radius surface, but becomes lower as the airflow surface 190 extends toward the trailing edge 194.

Figure 9C:
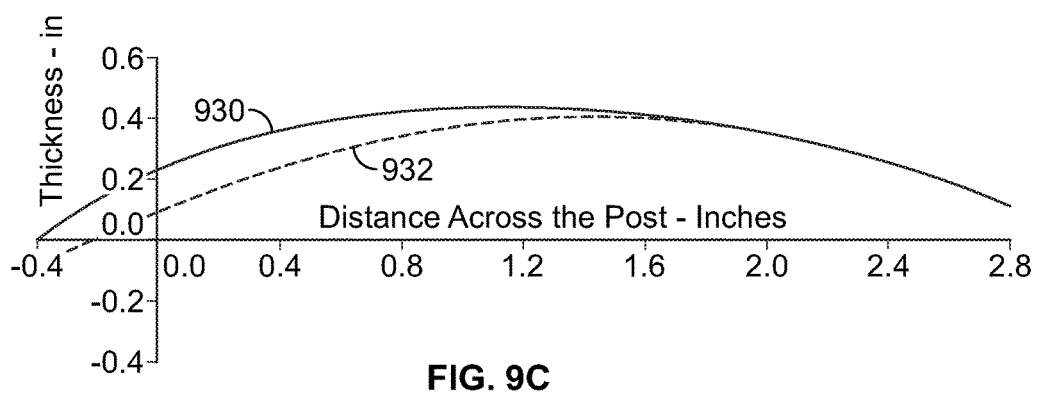
FIG. 9C is a plot of thickness along a length of an airflow surface of the post of FIG. 7 at the location proximate the intermediate height of the post.

FIG. 9C is a plot of thickness along the length 196 of the airflow surface 190 of the post 130 at the location proximate the intermediate height 701 of the airflow surface 190. The solid plot 930 depicts the thickness proximate the intermediate height 701, while the dashed plot 932 depicts the thickness at an intermediate position of an airflow surface having a constant radius of curvature. As seen in FIG. 9C, the thickness of the airflow surface proximate the intermediate height 701 is initially larger (proximate the leading edge 192) than the thickness of the plot 932 of the constant radius surface, but eventually becomes similar to the thickness of the constant radius surface as the airflow surface 190 extends toward the trailing edge 194.

Figure 10A:
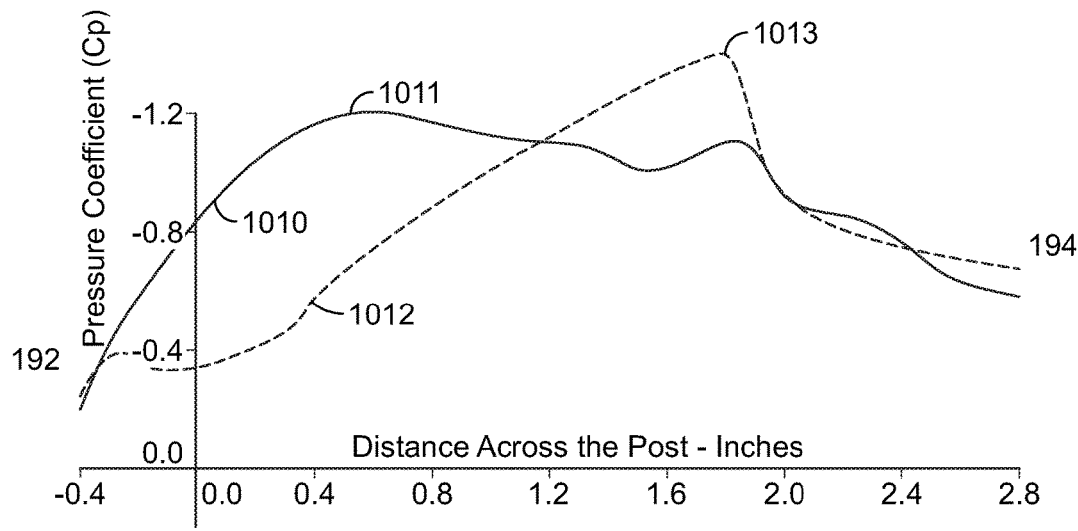
FIG. 10A is a plot of pressure coefficients along a length of an airflow surface of the post of FIG. 7 at a location proximate a top of the post.

FIG. 10A is a plot of pressure coefficients along the length 196 of the airflow surface 190 of the post 130 at a location proximate the top 198 of the airflow surface 190. The solid plot 1010 depicts the pressure coefficient of the airflow surface 190 proximate the top 198, while the dashed plot 1012 depicts the pressure coefficient at a top position of an airflow surface having a constant radius of curvature. As seen in FIG. 10A, the pressure coefficient of the airflow surface 190 proximate the top 198 is initially higher (proximate the leading edge 192) than the pressure coefficient of the plot 1012 of a constant radius airflow surface, but becomes relatively lower farther along the length of the airflow surface 190, and has a lower maximum value 1011 than the maximum value 1013 of the plot 1012 corresponding to a constant radius surface.

Figure 10B:
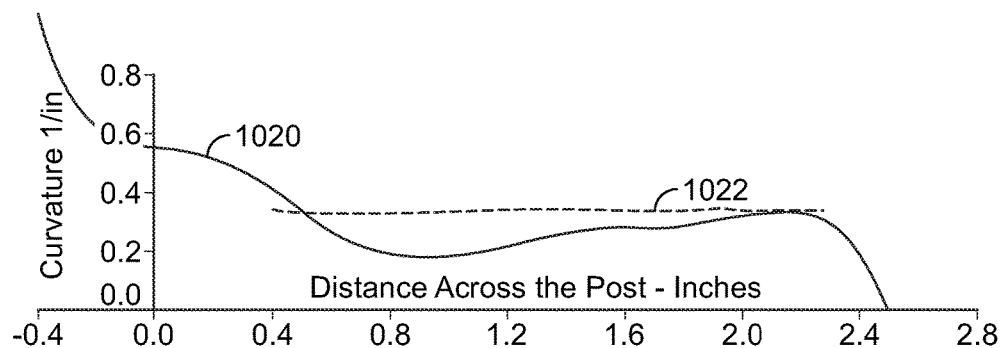
FIG. 10B is a plot of curvature along a length of an airflow surface of the post of FIG. 7 at the location proximate the top of the post.

FIG. 10B is a plot of curvature along the length 196 of the airflow surface 190 of the post 130 at the location proximate the top 198 of the airflow surface 190. The solid plot 1020 depicts the curvature of the airflow surface 190 proximate the top 198, while the dashed plot 1022 depicts the curvature at a top position of an airflow surface having a constant radius of curvature. As seen in FIG. 10B, the curvature of the airflow surface 190 proximate the top 198 is initially higher (proximate the leading edge 192) than the curvature of the plot 1022 of the constant radius surface, but becomes lower as the airflow surface 190 extends toward the trailing edge 194.

Figure 10C:
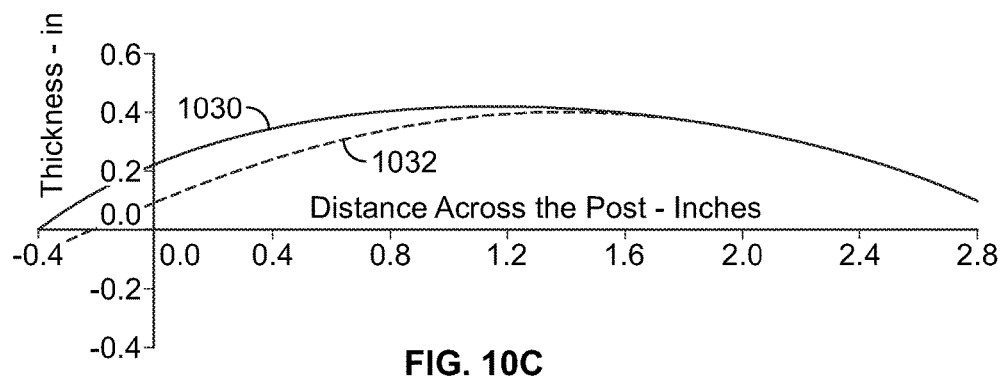
FIG. 10C is a plot of thickness along a length of an airflow surface of the post of FIG. 7 at the location proximate the top of the post.

FIG. 10C is a plot of thickness along the length 196 of the airflow surface 190 of the post 130 at the location proximate the top 198 of the airflow surface 190. The solid plot 1030 depicts the thickness proximate the top 198, while the dashed plot 1032 depicts the thickness at a top position of an airflow surface having a constant radius of curvature. As seen in FIG. 10C, the thickness of the airflow surface proximate the top 198 is initially larger (proximate the leading edge 192) than the thickness of the plot 1032 of the constant radius surface, but eventually becomes similar to the thickness of the constant radius surface as the airflow surface 190 extends toward the trailing edge 194.

Generally, for the positions depicted in the plots of FIGS. 8-10, the curvature of the profile of the airflow surface 190 is increased toward the leading edge 192, which provides an increased negative pressure, or suction, proximate the leading edge 192 as shown in FIGS. 8A, 9A, and 10A. The curvature is then reduced below the constant radius curvature as the airflow surface 190 extends toward the trailing edge 194, allowing the suction peak to recover towards freestream pressure (where the pressure coefficient equals zero) without a shock. As discussed herein and depicted in FIGS. 8A-8C, 9A-9C, and 10A-10C, the dimensions or shape of the profile of the airflow surface 190 may vary along the height 197. Such variance may be tailored to address variations in local sweep (or vertical travel of airflow along the height 197) at different heights. For example, due to the geometry of the nose of an aircraft, the bottom position may have unswept incoming flow while the top position may have 45 degree swept incoming flow (or flow traveling equally along the directions defined by the length 196 and height 197).

Figure 5:
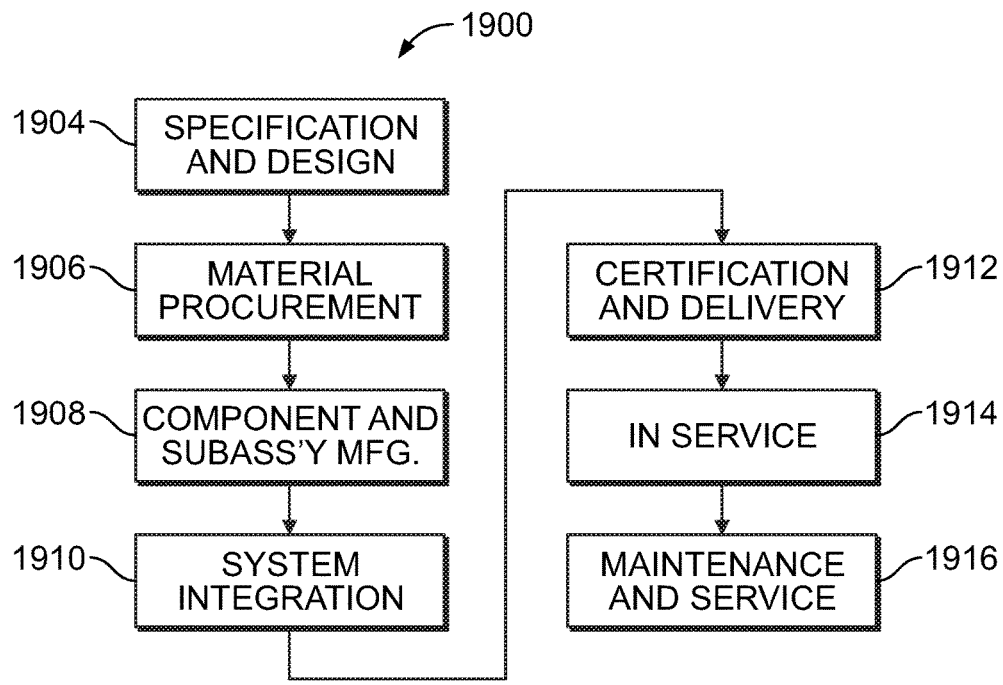
FIG. 5 is a block diagram of aircraft production and service methodology.
Figure 6:
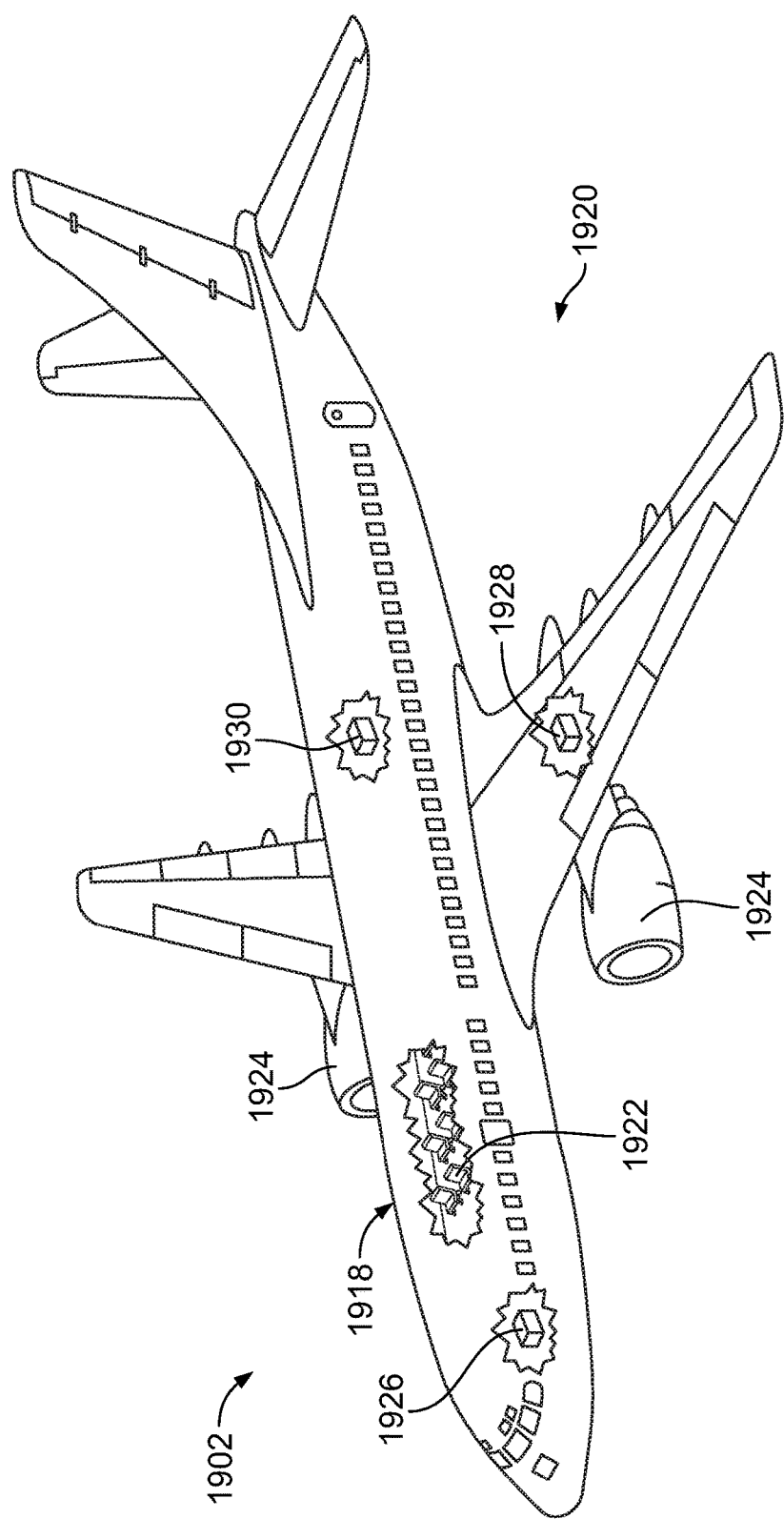
FIG. 6 is a schematic illustration of an aircraft.

Examples of the present disclosure may be described in the context of aircraft manufacturing and service method 1900 as shown in FIG. 5 and aircraft 1902 as shown in FIG. 6. During pre-production, service method 1900 may include specification and design (block 1904) of aircraft 1902 and material procurement (block 1906). During production, component and subassembly manufacturing (block 1908) and system integration (block 1910) of aircraft 1902 may take place. Thereafter, aircraft 1902 may go through certification and delivery (block 1912) to be placed in service (block 1914). While in service, aircraft 1902 may be scheduled for routine maintenance and service stage (block 1916). Routine maintenance and service may include modification, reconfiguration, refurbishment, etc. of one or more systems of aircraft 1902. For example, in various embodiments, examples of the present disclosure may be used in conjunction with one or more of blocks 1904, 1906, 1908, 1914, or 1916.

Each of the processes of service method 1900 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 6, aircraft 1902 produced by service method 1900 may include airframe 1918 with a plurality of high-level systems 1920 and interior 1922. Examples of high-level systems 1920 include one or more of propulsion system 1924, electrical system 1926, hydraulic system 1928, and environmental system 1930. Any number of other systems may be included. Although an aerospace example is shown, the principles disclosed herein may be applied to other industries, such as the automotive industry. Accordingly, in addition to aircraft 1902, the principles disclosed herein may apply to other vehicles, e.g., land vehicles, marine vehicles, space vehicles, etc. In various embodiments, examples of the present disclosure may be used in conjunction with one or more of airframe 1918 or interior 1922.

Apparatus(es) and method(s) shown or described herein may be employed during any one or more of the stages of the manufacturing and service method 1900. For example, components or subassemblies corresponding to component and subassembly manufacturing (block 1908) may be fabricated or manufactured in a manner similar to components or subassemblies produced while aircraft 1902 is in service. One or more examples of the apparatus or method realizations, or a combination thereof, may be utilized, for example and without limitation, while aircraft 1902 is in service, e.g., maintenance and service stage (block 1916).

Different examples of the apparatus(es) and method(s) disclosed herein include a variety of components, features, and functionalities. It should be understood that the various examples of the apparatus(es) and method(s) disclosed herein may include any of the components, features, and functionalities of any of the other examples of the apparatus(es) and method(s) disclosed herein in any combination, and all of such possibilities are intended to be within the spirit and scope of the present disclosure.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A window assembly for an aircraft comprising:
 a windshield oriented toward a front of the aircraft;
 a side window oriented toward a side of the aircraft;
 a post interposed between the windshield and the side window; and
 an airflow surface disposed on the post and on an exterior of the aircraft, the airflow surface extending along a length from a leading edge proximate the windshield to a trailing edge proximate the side window, the airflow surface extending along a height between a top and a bottom, the airflow surface having a first radius of curvature proximate the leading edge and a second radius of curvature proximate the trailing edge, wherein the first radius of curvature is less than the second radius of curvature.

2. The window assembly of claim 1, wherein a minimum radius of curvature for the airflow surface is interposed between the leading edge of the airflow surface and a midpoint of the airflow surface.

3. The window assembly of claim 1, wherein the side window is substantially flat and the airflow surface has a linear slope at the trailing edge.

4. The window assembly of claim 1, wherein a profile of the airflow surface is configured based on local flow conditions.

5. The window assembly of claim 1, wherein a profile of the airflow surface varies along the height of the airflow surface.

6. The window assembly of claim 1, wherein the length is between 3 and 4 inches, and the airflow surface defines a maximum thickness between 0.35 and 0.5 inches.

7. The window assembly of claim 1, wherein a maximum thickness defined by the airflow surface is interposed between the leading edge of the airflow surface and a midpoint of the airflow surface.

8. The window assembly of claim 1, further comprising a windshield frame surrounding at least a portion of the windshield, and a side frame surrounding at least portion of the side window, wherein the post comprises at least a portion of the windshield frame and at least a portion of the side frame.

9. The window assembly of claim 1, further comprising an aerodynamic member secured to an outer surface of the post, wherein the aerodynamic member comprises the airflow surface.

10. The window assembly of claim 1, wherein the airflow surface comprises a machined surface of the post.

11. A method comprising:
 providing a windshield oriented toward a front of an aircraft, a side window oriented toward a side of the aircraft, and a post interposed between the windshield and the side window; and
 forming an airflow surface disposed on the post and on an exterior of the aircraft, the airflow surface extending along a length from a leading edge proximate the windshield to a trailing edge proximate the side window, the airflow surface extending along a height between a top and a bottom, the airflow surface having a first radius of curvature proximate the leading edge and a second radius of curvature proximate the trailing edge, wherein the first radius of curvature is less than the second radius of curvature.

12. The method of claim 11, wherein forming the airflow surface comprises securing an aerodynamic member to an outer surface of the post, wherein the aerodynamic member comprises the airflow surface.

13. The method of claim 12, wherein securing the aerodynamic member to the outer surface of the post comprises securing an interior surface of the aerodynamic member to the outer surface of the post, wherein the interior surface defines a constant radius of curvature.

14. The method of claim 11, wherein a profile of the airflow surface varies along the height of the airflow surface.

15. The method of claim 11, wherein a maximum thickness defined by the airflow surface is interposed between the leading edge of the airflow surface and a midpoint of the airflow surface.

16. An aerodynamic member configured to be secured to an aircraft window assembly, the aircraft window assembly comprising a windshield oriented toward a front of an aircraft, a side window oriented toward a side of the aircraft, and a post interposed between the windshield and the side window, the aerodynamic member comprising:

an airflow surface configured to be disposed on the post and on an exterior of the aircraft when the aerodynamic member is secured to the aircraft window assembly, the airflow surface extending along a length from a leading edge of the airflow surface to a trailing edge of the airflow surface, the airflow surface extending along a height between a top and a bottom, the airflow surface having a first radius of curvature proximate the leading edge and a second radius of curvature proximate the trailing edge, wherein the first radius of curvature is less than the second radius of curvature.

17. The aerodynamic member of claim 16, further comprising an interior surface of the aerodynamic member configured to be secured to an outer surface of the post, wherein the interior surface defines a constant radius of curvature.

18. The aerodynamic member of claim 16, wherein a profile of the airflow surface varies along the height of the airflow surface.

19. The aerodynamic member of claim 16, wherein a minimum radius of curvature for the airflow surface is interposed between the leading edge of the airflow surface and a midpoint of the airflow surface.

20. The aerodynamic member of claim 16, wherein a maximum thickness defined by the airflow surface is interposed between the leading edge of the airflow surface and a midpoint of the airflow surface.

* * * * *